Dec. 11, 1962   F. N. SPAIN ETAL   3,067,494
HIGH TEMPERATURE SANDWICH STRUCTURE
Filed May 28, 1958   2 Sheets-Sheet 1

INVENTORS.
FRANK N. SPAIN
CARL A. VAN PAPPELENDAM
BY
AGENT

Dec. 11, 1962  F. N. SPAIN ETAL  3,067,494
HIGH TEMPERATURE SANDWICH STRUCTURE
Filed May 28, 1958  2 Sheets-Sheet 2

INVENTORS.
FRANK N. SPAIN
CARL A. VAN PAPPELENDAM
BY
AGENT 3,067,494
HIGH TEMPERATURE SANDWICH STRUCTURE
Frank N. Spain, Fullerton, and Carl A. Van Pappelendam, Rivera, Calif., assignors to North American Aviation, Inc.
Filed May 28, 1958, Ser. No. 738,398
6 Claims. (Cl. 29—183)

This invention relates to sandwich material and more specifically to sandwich material which is suitable for extremely high temperature conditions.

As weight is a premium in aircraft construction, airframe manufacturers have found it advantageous to use sandwich material, i.e., structure with two facing sheets with a low density core medium therebetween in order to give a light weight, but very rigid structure. Honeycomb sandwich structure such as shown in the Patent No. 2,700,632 has these characteristics. However, honeycomb structure has disadvantages which makes it undesirable at extremely high temperatures to which hypersonic flight subjects outer skins. Although the outside skin becomes very hot in such flight, it is desired that the inside skin, and therefore the interior of the compartment, remain cool. In order to accomplish these features, there should be as few conducting paths between the outside skin and the inside skin as possible to minimize heat transfer; however, as seen, honeycomb structure has many conducting paths in its core. Honeycomb structure also has the disadvantage that it is very costly to manufacture due to the structure involved and since the temperature of the whole piece must be raised to the brazing temperature while being held in suitable jigs to prevent warping. Resistance welded sandwich structure is not entirely unique as it is shown in Patent No. 2,746,139 where the inventor obtains a corrugated-core type sandwich structure. However such structure, while being able to work satisfactorily at the high temperatures involved, still has the disadvantages that the conducting paths between the two skins are numerous. Also, due to the method of construction, the distance between the face sheets cannot be easily varied in such sandwich material by varying the dimensions of the core material. Further, the structure is anisotropic rather than isotropic and, therefore, has inherent design difficulties.

The present invention overcomes the disadvantages of the prior art in that it provides a low density core sandwich material which is resistance welded in order to withstand the high temperatures involved and also has extremely small heat conducting paths in the core. Further, the structure is isotropic in that it has the same strength and flexibility properties in all directions. In addition to the above, the present invention has the advantage that the material is economical to produce.

Therefore, it is an object of this invention to provide a new type of sandwich structure.

It is a further object to provide sandwich structure which is suitable for use in extremely high temperature conditions.

It is a further object of the present invention to provide a sandwich structure which has a minimum of conducting paths between the two face sheets of the structure.

It is a further object of this invention to provide a high temperature sandwich structure with minimum heat conducting paths in the core which is economical to produce.

Other and further objects of the invention will become apparent in the detailed description below wherein FIG. 1 is a plan view of the present sandwich structure;

Figure 1:
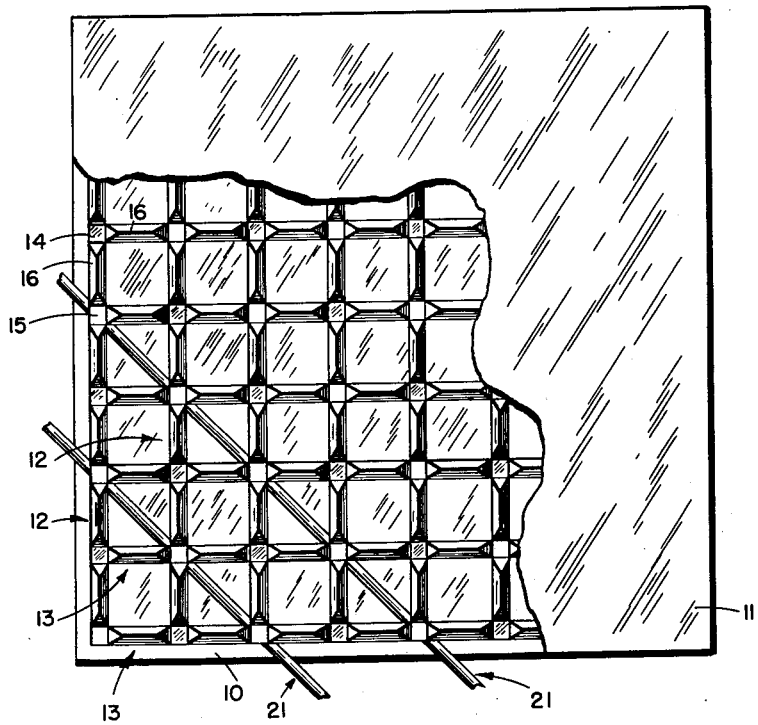

As shown in FIG. 1, the sandwich structure herein has a first face sheet 10 and a second face sheet 11 which are in fixed relation. Face sheet 11 has been cut away in order to show the details of the core structure in the plan view. As shown, a first series of parallel zig-zag truss-core members, indicated generally by arrows 12, is provided extending in a first direction. Extending at right angles to the core members 12 is a second series of parallel zig-zag truss core members designated generally by the arrows 13. These zig-zag truss core members are attached to the face sheet 10 at their nadir portions 14 and to the face sheet 11 at their apex portions 15 in the manner described below. The core members have their legs 16 extending between the nadir and apex portions 14 and 15 respectively at an angle of approximately 45° to the plane of the face sheets which gives the optimum strength in all directions. However, the angle could be more or less as required for any particular use. The spacing between the parallel core members can be varied, but for one-inch thick sandwich it is best to have the members substantially one inch apart. For high temperatures it is best to make the sandwich structure out of stainless steel, Inconel, or molybdenum; however, for the lower temperatures, aluminum or other materials are satisfactory.

Figure 2:
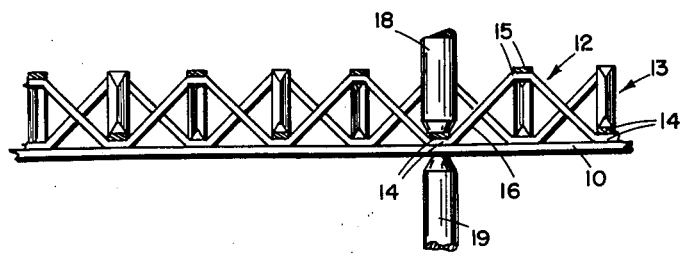
FIG. 2 is a side view of the structure at an initial stage of manufacture showing the core structure being attached to one face sheet.

FIG. 2 shows the sandwich structure at an initial stage of manufacture. In practice, the truss core members 12 and 13 are formed from material to the desired zig-zag shape which is shown in this figure and a cross-sectional shape such as described below, then a first series of formed core members 12 are placed on face sheet 10 parallel to each other. Preferably, the core members 12 are equally spaced apart a distance which is equal to the distance between the successive nadir portions and the apex portions. A second series of core members 13 are placed on the face sheet 10 at a right angle to the core members 12 with their respective nadir portions 14 and their apex portions 15 abutting each other and thereby forming squares in the plan view, as shown in FIG. 1. Electrodes 18 and 19 are representative of the electrodes of an ordinary resistance welding machine which is used to weld the nadir portions of the truss core members to the face sheet 10. Only one set of electrodes is shown, but in practice a plurality of electrodes would be used in order to speed manufacture. After all of the nadir portions have been welded to the face sheet 10, the top face sheet 11 is attached to the core structure. With 0.025 face sheets and 0.025 core members, a weld of six cycles on a 60-cycle machine at 500 p.s.i. and 6000 amps works satisfactorily.

Figure 3:
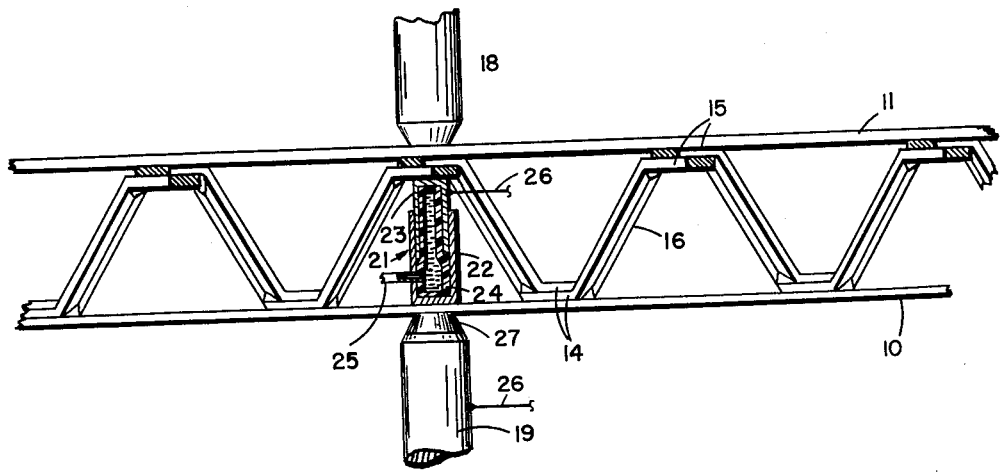
FIG. 3 shows the apex portions of the core members apices being supported in order to obtain a suitable weld.

FIG. 3 shows the present sandwich material when looking at the structure at an angle of 45° to the core members. As shown, the face sheet 11 has been laid upon the core structure, and an internal support means such as the mandrel indicated generally by arrow 21 is inserted in collapsed form into the core structure at a 45° angle to core members 12 and 13, when all of the core members are spaced apart equally, to insure proper support of the apex portions 15 during the weld cycle when said support is expanded into operative position as hereinafter explained. Such a support is necessary because the core members get weak when they become hot during the weld cycle and if not supported there will not be adequate pressure between the core member apices and the face sheet 11.

The internal support means can be made of any one of a number of forms. The means shown comprises a first U-shaped channel 22 with a second U-shaped channel 23, having an outside dimension which is slightly smaller than the inside dimension of channel 22, movably mounted within the channel 22 in opposed relation, and thereby forming an enclosed space. These channels are made of a high conducting material such as copper in order to concentrate the current flow through the supported apices. In order to move the channel members apart into operative position to thus support the apex portions, the inflatable hermetically sealing boot 24 is provided and has the pressure line 25 connected into it which in turn is connected to a conventional type hydraulic pressure source that is not shown. It is obvious that upon completion of the welding operation that the pressure in inflatable boot 24 may be selectively relieved to thereby collapse the channels 22 and 23 and thus provide for expeditious removal of the internal support means. The hydraulic fluid further functions to keep the mandrel and the boot cool during the welding operation.

A shunt wire 26 is provided to connect the electrode 19 with the channel member 23, and an insulation cap 27 is placed on the tip of electrode 19. With this system, the current for the weld flows through the circuit provided by electrode 18, apex portions 15, the upper portion of channel 23, shunt wire 26 and electrode 19. With such a circuit it is obvious that the electrical current is concentrated in the particular apex portions being welded, and the current does not have to pass through sheet 10. Therefore, the electrode 19 is essentially used only to supply pressure on the bottom of the mandrel 21.

For illustrative purposes, only two internal support means are shown in FIG. 1. However, it is to be understood that in practice, many such support means would be used in order to speed up the manufacture of the structure. Further, other means to support the apices, such as expendable electrodes as disclosed in Patent No. 2,820,136, could be used.

The zig-zag truss core members can take any one of several shapes, but they must be light in weight and rigid, as well as provide the least practicable thermo-conducting path. Therefore, the present invention provides that each of the core members is made of thin material and the central portion of each leg is formed in a non-planar cross section with none of the material in this portion of the leg lying in the neutral axis of the leg. The neutral axis of the leg is defined by a line passing through the center of gravity of the material in any cross section of the leg. With such structure, each leg has opposed wall portions which diverge from a common line which is parallel to, but displaced from the neutral axis of that leg. Such form allows a light-weight leg to be rigid and able to take the loads without bending.

Figures 4, 5:
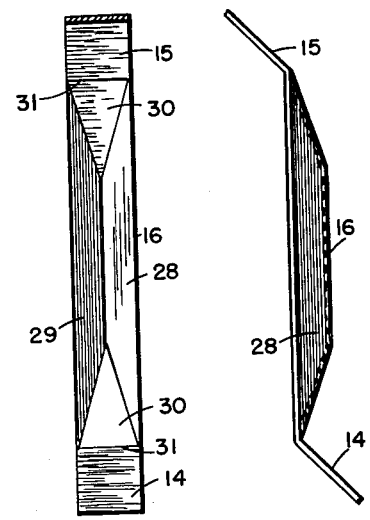
FIG. 4 shows a detailed side view of one form of the leg of the truss member.
FIG. 5 shows a detailed top view of the truss members shown in FIG. 4.

FIGS. 4 and 5 show detailed views of one shape that the core structure preferably takes. As shown, the structure has a generally V-shape which is formed of the two planar walls 28 and 29 respectively which are opposed and diverge from the common line at the base of the V. It has been found that the core members should be substantially as thick as the face sheet and have a width of from eight to twelve times its thickness in order to be formed in such configuration which cuts the weight and heat-conducting properties but yet still provide the rigidity required. In order that the truss member may be bent at the edge of the nadir or apex portions, the cross section of the leg changes from a V-shape to a planar shape and a triangular planar portion is provided at either end of the leg so that the leg may be bent at line 31.

Figures 6, 7:
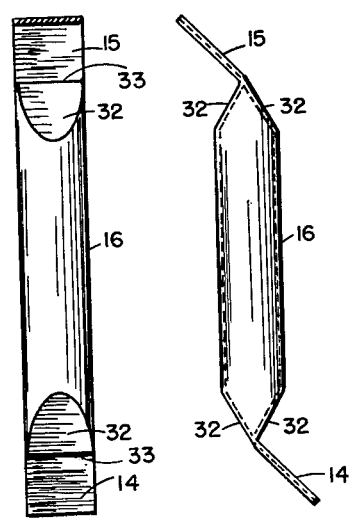
FIG. 6 shows a detailed view of the side view of another form of the truss member.
FIG. 7 shows a detailed top view of the form of the truss member shown in FIG. 6.

FIGS. 6 and 7 show another structure which operates satisfactorily with the subject invention. In this case, the zig-zag truss core members are made from a tube which is bent and flattened at prescribed places in order to obtain the proper shape. The leg 16 here has a circular cross section throughout the central portion of its length and has opposed wall portions which diverge from a common line which is parallel to, but displaced from the neutral axis of the leg. In order that the leg be bent at the edge of the nadir or apex portions, the cross section of the structure is changed from a circular to planar cross section by flattening the tube and providing the semi-elliptical surfaces 32 with their bases abutting at line 33 at either end of the leg 16. The dimensions of the portions of the sandwich structure could be varied, but for use in the missile field, one-inch thick sandwich structure having 0.025 face sheet should have tubes of 3/16-inch diameter with a wall thickness of 0.010 inch. Such structure has the advantage that the materials are economical and a rigid leg is provided which has a low weight and low thermo-conducting properties.

Although two preferred embodiments of the present invention has been illustrated and described herein, it is to be understood that the invention is not limited thereto for the same is susceptible to changes in detail and form within the scope of the appended claims.

We claim:

1. A high-temperature sandwich structure comprising first and second spaced sheets, a first series of parallel zig-zag truss core members between and substantially perpendicular relative to said sheets and having nadir and apex portions, a second separate series of parallel zig-zag truss core members extending at right angles to said first series and substantially perpendicular relative to said sheets and having nadir and apex portions which overlap and are attached to the respective nadir and apex portions of said first series, said truss members being attached to said sheets at their nadir and apex portions, the legs of said core members having non-planar cross sections, each leg having opposing wall portions diverging from a common line which is parallel to and displaced from the axis of that leg, the cross section of said legs becoming planar adjacent said nadir and apex portions.

2. A high-temperature sandwich structure comprising first and second spaced sheet, a first series of parallel zig-zag truss core members between and substantially perpendicular relative to said sheets and having nadir and apex portions, a separate second series of parallel zig-zag truss core members extending at right angles to said first series and substantially perpendicular relative to said sheets and having nadir and apex portions which overlap and are attached to the respective nadir and apex portions of said first series, said truss members being attached to said sheets at their nadir and apex portions, the legs of said truss members each having two planar walls forming a V cross section for most of the central portions of the lengths of the legs, the cross section of said legs becoming planar at their ends, said nadir and apex portions being substantially planar.

3. A high-temperature sandwich structure comprising first and second spaced sheet, a first series of parallel zig-zag truss core members between and substantially perpendicular relative to said sheets and having nadir and apex portions, a separate second series of parallel zig-zag truss core members extending at right angles to said first series and substantially perpendicular relative to said sheets and having nadir and apex portions which overlap and are attached to the respective nadir and apex portions of said first series, said truss members being attached to said sheets at their nadir and apex portions, the legs of said truss members having a thin cross section and having two planar portions forming a V, said legs having a triangular planar portion at either end which extends from the base of the V to the edge of said V forming portions, said nadir and apex portions being substantially planar, said triangular surfaces extending from the apex portions and nadir portions.

4. High temperature sandwich structure comprising first and second spaced sheet, a first series of parallel zig-zag truss core members between and substantially perpendicular relative to said sheets and having nadir and apex portions, a separate second series of parallel zig-zag truss core members extending at right angles to said first series and substantially perpendicular relative to said sheets and having nadir and apex portions which overlap and are attached to the respective nadir and apex portions of the first series, said truss members being attached to said sheets at their nadir and apex portions, legs on said truss members which extend between the nadir and apex portions, each of said legs having a hollow circular cross section throughout a central portion of their lengths, said cross section becoming planar at either end where each leg terminates in respective nadir and apex portions.

5. The invention as claimed in claim 4 wherein the legs have a circular cross section and the legs are provided with two semi-elliptical planar portions at either end, said semi-elliptical portions having their bases abutting each other, said nadir and apex portions being substantially planar, said semi-elliptical portions extending from said apex and nadir portions.

6. A sandwich structure comprising: first and second spaced sheets; a series of first and second individual and continuous members intermediate and perpendicular with respect to said spaced sheets, said first and second members comprising: apex portions adjacent said first sheet, nadir portions adjacent said second sheet and leg portions connected to and diverging from said apex portions and connected to said nadir portions; at least one of said first members constructed and arranged in a plane intersecting the plane of at least one of said second members, the apex portion of said at least one of said first members secured to said first sheet and the apex portions of said at least one of said second members secured to the apex portions of said at least one of said first members and spaced from said first sheet thereby; the nadir portions of said at least one of said second members secured to said second sheet and the nadir portions of said at least one of said first members secured to the nadir portions of said at least one of said second members and spaced from said second sheet thereby, whereby the stress concentrations occurring at the points of securance of said first and second members to said first and second sheets due to extreme vibrational loads are greatly reduced.

References Cited in the file of this patent

UNITED STATES PATENTS

| | | |
|---|---|---|
| 1,560,996 | Kellogg | Nov. 10, 1925 |
| 2,292,373 | Gerlack | Aug. 11, 1942 |
| 2,356,675 | Lachman | Aug. 22, 1944 |
| 2,746,139 | Van Pappelendam | May 22, 1956 |
| 2,791,386 | Kastan | May 7, 1957 |

FOREIGN PATENTS

| | | |
|---|---|---|
| 1,124,180 | France | Oct. 5, 1956 |
| 561,214 | Great Britain | May 10, 1944 |

UNITED STATES PATENT OFFICE
CERTIFICATE OF CORRECTION

Patent No. 3,067,494                December 11, 1962

Frank N. Spain et al.

It is hereby certified that error appears in the above numbered patent requiring correction and that the said Letters Patent should read as corrected below.

Column 4, lines 27, 31, 43, 47, 59, and 63, and column 5, lines 2 and 6, after "and", each occurrence, insert -- constructed and arranged in planes which are --; column 5, line 25, after "and" insert -- constructed and arranged in planes which are substantially --.

Signed and sealed this 25th day of June 1963.

(SEAL)
Attest:

ERNEST W. SWIDER
Attesting Officer

DAVID L. LADD
Commissioner of Patents